UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS OF SEPARATING PHOSPHORUS FROM ITS PHOSPHATE COMBINATIONS.

1,129,504. Specification of Letters Patent. Patented Feb. 23, 1915.

No Drawing. Application filed July 8, 1912. Serial No. 708,276.

*To all whom it may concern:*

Be it known that I, SAMUEL PEACOCK, a citizen of the United States, residing at Chicago, in the county of Cook and State of Illinois, have invented certain new and useful Improvements in Processes of Separating Phosphorus from Its Phosphate Combinations; and I do hereby declare the following to be a full, clear, and exact description of the invention, such as will enable others skilled in the art to which it appertains to make and use the same.

This invention relates to a process of separating phosphorus from its phosphate combinations while at the same time producing carbids and nitrids of phosphorus which may be utilized in the production of phosphorus oxids, or nitrogen salts at will.

The invention has for its object the attainment of the above results in a simple, expeditious and comparatively inexpensive manner, and to these ends consists in the novel steps constituting my process as will be more fully hereinafter disclosed and particularly pointed out in the claims.

In carrying out my process I finely divide a natural phosphate rock such as the tricalcium phosphate, $Ca_3P_2O_8$, and mix same with a suitable quantity of finely divided carbon such as ground coke, coal dust or other form of fuel carbon. The mixed carbon and phosphate is then heated to a temperature of about 900° C. in an atmosphere containing substantially no free oxygen, when it is found that phosphorus is evolved either as a carbid such as $P_2C_5$, or in the form of a vapor. If the reaction is carried out in an atmosphere of nitrogen, free from air, then phosphorus is given off as a nitrid, such as $P_3N_5$, or as a carbo-nitrid such as $P_2C_5N_{10}$, or as a mixture of these two compounds together with some carbid $P_2C_5$, and a considerable quantity of free phosphorus, P, in a vaporous form. At present I am unable to say with certainty whether this free phosphorus is displaced as such or is a decomposition product. It is not probable, however, for various reasons, that free phosphorus would be produced under the conditions stated, and therefore I believe its presence is due to a decomposition of one or more of the above compounds. While phosphorus bearing compounds are produced at the temperature and under the conditions stated, the velocity of the reaction is greatly increased by raising the temperature to say between 1100° C. and 1300° C. Further, the decomposition of the phosphate is greatly facilitated by maintaining a low partial pressure of the products of the reaction. This may be accomplished by carrying out the process in a gas tight furnace through which the mixture is continuously fed, while nitrogen is admitted at the discharge end and continuously drawn through and out of the furnace at the feed end; a vacuum pump at the feed end of the furnace being used to maintain the partial pressures at the desired values. But I prefer to maintain low partial pressures by simply flushing the furnace at intervals during the process either with nitrogen, or with an inert or neutral gas such as hydrogen, or even with ordinary fuel or illuminating gas.

I am not as yet able to say with certainty just what atomic linkages are involved in the products actually produced, but from the presence of free phosphorus, combined carbon and combined nitrogen (when nitrogen is present in the furnace), and from other considerations, I believe the normal valencies persist, and that the above compounds are the ones produced in the greatest quantities although there may be others present in smaller proportions. That is to say, the products found in the furnace seem to be limited to the following:—carbon monoxid, CO; phosphorus carbid, $P_2C_5$; phosphorus nitrid, $P_3N_5$; phosphorus carbo-nitrid, $P_2C_5N_{10}$; free phosphorus, P; and nitrogen, N. The last may, of course, be due to an excess of nitrogen present, but I believe at least some of it as well as substantially all of the free phosphorus is due to secondary decompositions. When the temperature is high and the partial pressures kept low by flushing with nitrogen gas, most of the furnace products are found to be carbon monoxid, CO, and phosphorus carbo-nitrid, $P_2C_5N_{10}$, with some free phosphorus and nitrogen as probable secondary decomposition products.

It will be observed from the foregoing that at the comparatively low temperatures between 900° C. and 1300° C. I am enabled to separate out from its associated compounds the phosphorus in phosphate rock, and to drive it off in the form of a gas or vapor. The gaseous phosphorus compounds may then be substantially wholly decomposed by passing them through fire clay tubes maintained at temperatures of from say 1200° C. to 1400° C., and the free phosphorus recovered by condensation in the usual manner, or the said gaseous compound may be burned in air, as stated below, to produce the pentoxid, $P_2O_5$, which latter may then be recovered as such or combined with water in the manner well known, to form phosphoric acid, $H_3PO_4$. When the phosphorus nitrid, $P_3N_5$, is present in sufficient quantity to render the recovery of its nitrogen profitable, this gas may be pumped from the furnace into an autoclave and treated with superheated steam at a pressure of say not less than two atmospheres, when the following reaction takes place:—

$$2P_3N_5 + 24H_2O = 6NH_4.H_2PO_4 + 4NH_3.$$

On the other hand when the phosphorus carbonitrid, $P_2C_5N_{10}$, is present in sufficient quantity to render the recovery of its combined nitrogen desirable, it may be likewise pumped into an autoclave, and treated with superheated steam as above, when the following reaction will take place:—

$$P_2C_5N_{10} + 18H_2O = 2NH_4.H_2PO_4 + 8NH_3 + 5CO_2.$$

In treating the furnace gases with superheated steam, any phosphorus carbid, $P_2C_5$, that might be present will break up as follows:—

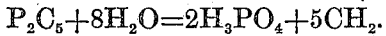
$$P_2C_5 + 8H_2O = 2H_3PO_4 + 5CH_2.$$

Again, when it is desired to produce phosphorus pentoxid, $P_2O_5$, only, instead of passing the furnace gases through fire clay tubes for the recovery of free phosphorus as above described, said gases may be mixed with air in excess, and burned at once to the pentoxid form, when the latter may be recovered as such, or treated with water to produce phosphoric acid, or with water and gases to form phosphates in the manner well known.

In the step of treating the furnace gases with superheated steam the velocity of the reaction may be controlled by regulating the pressure of the steam. At two atmospheres pressure the reaction velocity is slow; as the pressure and therefore the temperature increases, however, the reaction velocity increases in accordance with well known thermodynamic laws.

It is obvious that those skilled in the art may vary the details of my process without departing from the spirit thereof, and therefore I do not wish to be limited to the above disclosure except as may be required by the claims.

What I claim is:—

1. The process of releasing phosphorus from its phosphate combinations and forming a carbid of phosphorus which consists in heating a phosphate in the presence of carbon and in an atmosphere devoid of free oxygen to a temperature above 900° C., substantially as described.

2. The process of releasing phosphorus from its phosphate combinations and forming a carbid of phosphorus which consists in heating a phosphate in the presence of carbon and in an atmosphere devoid of free oxygen to a temperature substantially between 900° C. and 1300° C., substantially as described.

3. The process of releasing phosphorus from its phosphate combinations which consists in heating a phosphate in an atmosphere of nitrogen substantially devoid of free oxygen and in the presence of carbon to a temperature above 900° C., while reducing below the normal the partial pressures of the reaction products, substantially as described.

4. The process of forming nitrids of phosphorus which consists in heating a natural phosphate mixed with carbon in an atmosphere substantially devoid of free oxygen, and in the presence of free nitrogen, to a temperature substantially between 900° C. and 1300° C., substantially as described.

5. The process of forming nitrids of phosphorus which consists in heating a natural phosphate mixed with carbon in an atmosphere substantially devoid of free oxygen, and in the presence of free nitrogen, to a temperature substantially between 900° C. and 1300° C.; while substantially maintaining the partial pressures of the reaction products below their normal values, substantially as described.

6. The process of producing fixed nitrogen compounds which consists in heating a mixture of phosphate and carbon in an atmosphere of nitrogen to a temperature sufficient to bring about the reaction; collecting the gases thus produced; and treating them with steam at a temperature sufficient to produce the desired nitrogen compounds, substantially as described.

In testimony whereof, I affix my signature, in presence of two witnesses.

SAMUEL PEACOCK.

Witnesses:
D. S. TOVELL,
R. S. CHILTON.